United States Patent
Craig et al.

(10) Patent No.: US 10,060,793 B2
(45) Date of Patent: Aug. 28, 2018

(54) SPECTRAL AND SPATIAL CALIBRATION ILLUMINATOR AND SYSTEM USING THE SAME

(71) Applicant: Xerox Corporation, Norwalk, CT (US)

(72) Inventors: David C. Craig, Pittsford, NY (US); Robert P. Herloski, Webster, NY (US); David A. Mantell, Rochester, NY (US); Douglas E. Proctor, Rochester, NY (US); Jonathan B. Hunter, Marion, NY (US); Stuart Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/000,488

(22) Filed: Jan. 19, 2016

(65) Prior Publication Data
US 2017/0205285 A1   Jul. 20, 2017

(51) Int. Cl.
| | |
|---|---|
| *G01J 3/02* | (2006.01) |
| *G01J 3/427* | (2006.01) |
| *G01J 3/10* | (2006.01) |
| *G01J 3/28* | (2006.01) |

(52) U.S. Cl.
CPC ............. *G01J 3/0297* (2013.01); *G01J 3/027* (2013.01); *G01J 3/10* (2013.01); *G01J 3/2803* (2013.01); *G01J 3/427* (2013.01); *G01J 2003/2806* (2013.01)

(58) Field of Classification Search
CPC .. G01J 3/0297; G01J 3/427; G01J 3/10; G01J 3/2803; G01J 3/027; G01J 2003/2806
See application file for complete search history.

(56) References Cited

U.S. PATENT DOCUMENTS

| | | | | |
|---|---|---|---|---|
| 4,611,889 A | * | 9/1986 | Buzak ............... | G02F 1/133533 348/742 |
| 6,975,949 B2 | | 12/2005 | Mestha et al. | |
| 7,443,508 B1 | * | 10/2008 | Vrhel ........................ | G01J 3/10 348/195 |
| 7,474,402 B2 | * | 1/2009 | Shannon ................... | G01J 3/02 356/405 |
| 7,623,278 B2 | * | 11/2009 | Mestha ..................... | G01J 3/02 358/1.9 |

(Continued)

OTHER PUBLICATIONS http://www.photonstartechnology.com/learn/how_leds_produce_white_light.*

*Primary Examiner* — Mohamed K Amara
(74) *Attorney, Agent, or Firm* — Simpson & Simpson, PLLC

(57) ABSTRACT

A method of spatially and spectrally calibrating a spectrophotometer including: a) emitting a white light illumination output from a full width illumination source; b) illuminating a test patch with the white light illumination output; c) reflecting a portion of the white light illumination output from the test patch to form a white light reflected illumination output; d) receiving the white light reflected illumination output at first, second and third rows of photosensitive elements to form a first calibration data set; e) emitting a cyan light illumination output from the full width illumination source; f) illuminating the test patch with the cyan light illumination output; g) reflecting a portion of the cyan light illumination output from the test patch to form a cyan light reflected illumination output; and, h) receiving the cyan light reflected illumination output at the second and third rows of photosensitive elements to form a second calibration data set.

12 Claims, 8 Drawing Sheets

(56) References Cited

U.S. PATENT DOCUMENTS

| | | | | |
|---|---|---|---|---|
| 7,864,320 | B2* | 1/2011 | Bonino | G01J 3/02 356/402 |
| 8,075,084 | B2* | 12/2011 | Ossman | G01J 3/10 347/19 |
| 9,535,197 | B2* | 1/2017 | Cha | G02B 5/201 |
| 2005/0275806 | A1* | 12/2005 | Roth | H04N 9/3114 353/20 |
| 2006/0197949 | A1* | 9/2006 | Bouzid | G01J 3/2803 356/328 |
| 2007/0132953 | A1* | 6/2007 | Silverstein | H04N 13/0431 353/7 |
| 2008/0180665 | A1* | 7/2008 | Redman | G01J 3/02 356/326 |
| 2008/0291455 | A1* | 11/2008 | Holland | G01J 3/10 356/445 |
| 2010/0165134 | A1* | 7/2010 | Dowski, Jr. | B24B 13/06 348/218.1 |
| 2011/0089316 | A1* | 4/2011 | Hosier | G01J 3/12 250/252.1 |
| 2011/0255163 | A1* | 10/2011 | Merrill | G02B 5/0841 359/487.02 |
| 2013/0078616 | A1* | 3/2013 | Atrazhev | G01N 33/54366 435/5 |
| 2013/0208273 | A1* | 8/2013 | Dominguez-Caballero | G01J 3/0205 356/311 |
| 2014/0153823 | A1* | 6/2014 | Lee | G06T 3/4015 382/167 |
| 2015/0002707 | A1* | 1/2015 | Wu | H01L 27/14621 348/279 |
| 2015/0212294 | A1* | 7/2015 | Imamura | G03B 13/36 348/345 |
| 2017/0205285 | A1* | 7/2017 | Craig | G01J 3/0297 |

* cited by examiner

SPECTRAL AND SPATIAL CALIBRATION ILLUMINATOR AND SYSTEM USING THE SAME

TECHNICAL FIELD

The presently disclosed embodiments are directed to providing systems and methods for spatial and spectral calibration, more particularly for spatial and spectral calibration using an illumination source that emits at least two discrete spectral peaks, and even more particularly for spatial and spectral calibration using an illumination source that emits at least two discrete spectral peaks and a sensor having a filter that transmits at least a portion of the wavelengths of light between the at least two discrete spectral peaks.

BACKGROUND

Spectrophotometers are commonly used to make photometric comparisons of spectral characteristics of various samples. Samples could include but are not limited to illumination sources (measuring emission), filters (measuring transmission/absorption) and test patches (measuring reflectance). Typically, spectrophotometers measure a number of wavelength regions in order to quantify the spectral characteristics of a sample. For example, a scanning spectrophotometer may perform a sweep of wavelengths ranging from 570 nm to 610 nm when quantifying the spectral transmission of an interference filter having a central wavelength of 589.3 nm.

Conventional spectrophotometers fail to provide detailed information regarding a large area or linear distance. In other words, conventional spectrophotometers effectively provide an average value, e.g., reflectance at a given wavelength, over the entire measured area or field of view. Thus, in order to determine reflectance values for discrete regions over a larger area, multiple measurements must be taken at different fields of view. Conventional spectrophotometers are not practical options for both spectrally and spatially calibrating a system.

Alternatively, complementary metal-oxide semiconductor (CMOS) or charge-coupled device (CCD) optical detection arrays provide detailed spatial information, but limited spectral information. A monochromatic array integrates the spectral response across all wavelengths, while an array with separate red, green and blue detection, as achieved by filters, provides three pieces of spectral information but at the cost of tripling the number of detection elements.

The present disclosure addresses systems and methods for further improving illumination and detection systems for spectral and spatial calibration of a variety of devices, e.g., a spectrophotometer, a printer, etc.

SUMMARY

Broadly, the methods discussed infra provide methods and apparatuses for spectrally and spatially calibrating a variety of devices. The present embodiments are built off of a highly spatially resolved spectrophotometer based on a CCD/CMOS optical detection array combined with an illumination system comprising a full width illumination source such as a light pipe coupled to several light emitting diodes (LEDs), of different illumination spectra that can be rapidly switched. The system and methods can be used for a variety of applications. For example, they could be used in print quality evaluation. As a test print or test patch passes the illumination and detection system, color patches contained therein can be rapidly and sequentially illuminated by switching on and off LEDs, of different wavelengths, that are coupled to a light pipe which is used to uniformly illuminate the test print. The optical response at each illumination is captured by a CCD/CMOS array. Although the array only requires a monochromatic channel since spectral sampling is achieved through the illumination sources, if the detection system has more than a monochromatic channel, e.g., red, green and blue channels, then these channels may be used in combination with the illumination options to obtain optimal spectral information. The illumination source may cover the visible spectrum, as well as ultra-violet (UV) and/or infrared (IR) spectrum to provide additional information about the sample under investigation. In short, the present systems and methods can provide highly resolved spectral and spatial resolution for all types of devices that require colorimetric information, e.g., a printer, through the combination of a full width illumination source and a full width detection array.

According to aspects illustrated herein, there is provided a method of spatially and spectrally calibrating a spectrophotometer having a full width illumination source and a full width photodetector array, the full width illumination source includes a first plurality of spectral outputs and a second plurality of spectral outputs and the full width photodetector array includes adjacent first, second and third rows of photosensitive elements, the first row of photosensitive elements includes a red filter, the second row of photosensitive elements includes a green filter, and the third row of photosensitive elements includes a blue filter. The first plurality of spectral outputs combine to form a white light illumination output and the second plurality of spectral outputs combine to form a cyan light illumination output. The method includes: a) emitting the white light illumination output from the full width illumination source; b) illuminating a test patch with the white light illumination output; c) reflecting a portion of the white light illumination output from the test patch to form a white light reflected illumination output; d) receiving the white light reflected illumination output at the first, second and third rows of photosensitive elements to form a first calibration data set; e) emitting the cyan light illumination output from the full width illumination source; f) illuminating the test patch with the cyan light illumination output; g) reflecting a portion of the cyan light illumination output from the test patch to form a cyan light reflected illumination output; and h) receiving the cyan light reflected illumination output at the second and third rows of photosensitive elements to form a second calibration data set.

According to other aspects illustrated herein, there is provided a method of spatially and spectrally calibrating a spectrophotometer having a full width illumination source and a full width photodetector array. The full width illumination source includes a first plurality of spectral outputs and a second plurality of spectral outputs, and the full width photodetector array includes adjacent first, second, third and fourth rows of photosensitive elements. The first row of photosensitive elements includes a red filter, the second row of photosensitive elements includes a green filter, the third row of photosensitive elements includes a blue filter and the fourth row of photosensitive elements includes a filter. The first plurality of spectral outputs combine to form a white light illumination output and the second plurality of spectral outputs combine to form a cyan light illumination output. The method includes: a) simultaneously emitting the white light illumination output and the cyan light illumination output from the full width illumination source; b) illuminating a test patch with the white light illumination output and the cyan light illumination output; c) reflecting a portion of the white light illumination output and a portion of the cyan light illumination output from the test patch to form a white light reflected illumination output and a cyan light reflected illumination output; and d) receiving the white light reflected illumination output and the cyan light reflected illumination output at the first, second, third and fourth rows of photosensitive elements to form a first calibration data set.

According to other aspects illustrated herein, there is provided a method of spatially and spectrally calibrating a spectrophotometer having a full width illumination source and a full width photodetector array. The full width illumination source includes a first plurality of spectral outputs and the full width photodetector array includes adjacent first, second, third and fourth rows of photosensitive elements. The first row of photosensitive elements includes a red filter, the second row of photosensitive elements includes a green filter, the third row of photosensitive elements includes a blue filter, and the fourth row of photosensitive elements includes a fourth filter. The first plurality of spectral outputs combine to form a white light illumination output. The method includes: a) emitting the white light illumination output from the full width illumination source; b) illuminating a test patch with the white light illumination output; c) reflecting a portion of the white light illumination output from the test patch to form a white light reflected illumination output; and d) receiving the white light reflected illumination output at the first, second, third and fourth rows of photosensitive elements to form a first calibration data set.

Other objects, features and advantages of one or more embodiments will be readily appreciable from the following detailed description and from the accompanying drawings and claims.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
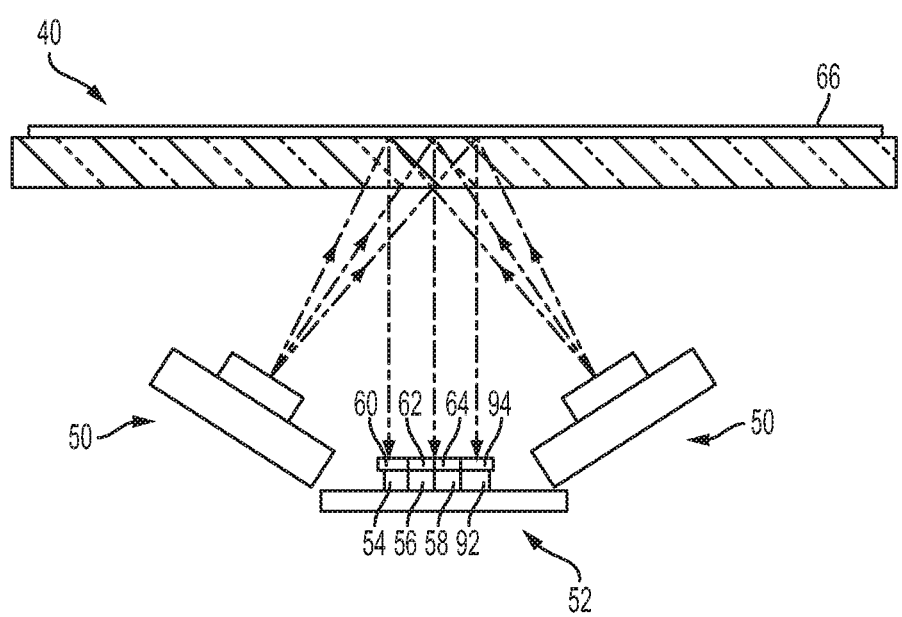
FIG. 1 is a schematic side view of an embodiment of a present full width scanning spectrophotometer used with the present method.
Figure 2:
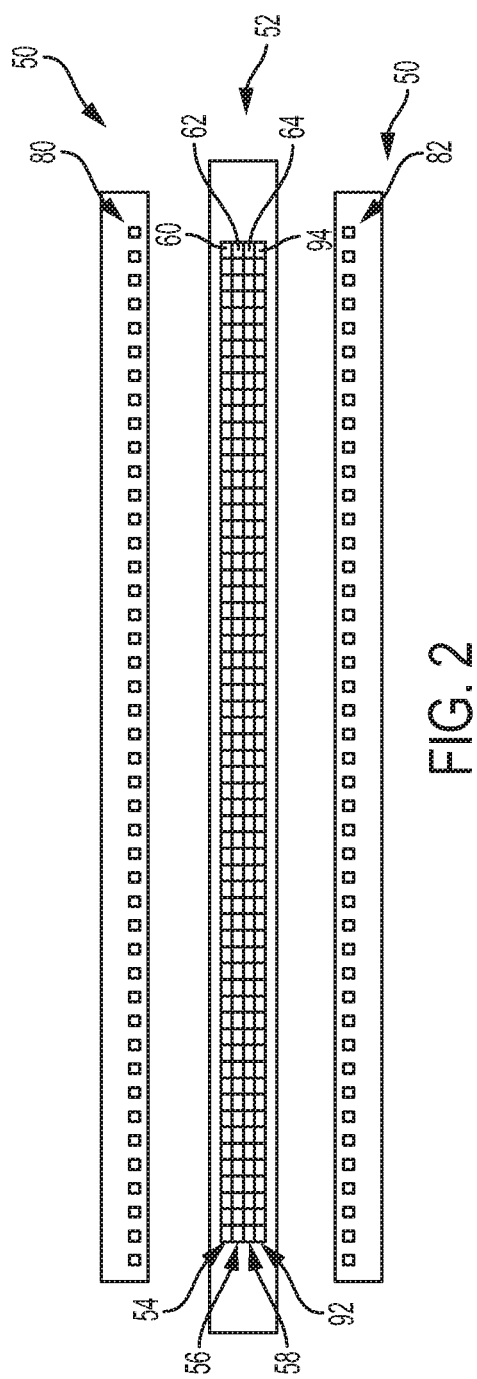
FIG. 2 is a top plan view of the full width scanning spectrophotometer depicted in FIG. 1.
Figure 3:
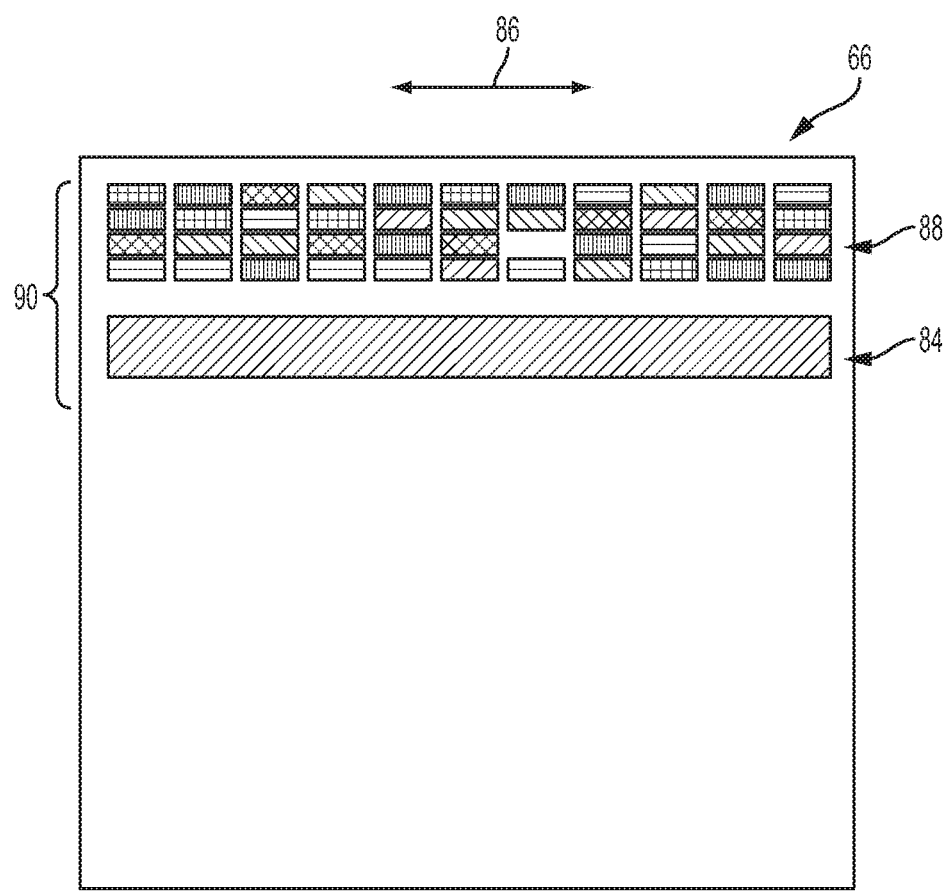
FIG. 3 is an embodiment of a test patch used in the present method.
Figure 4:
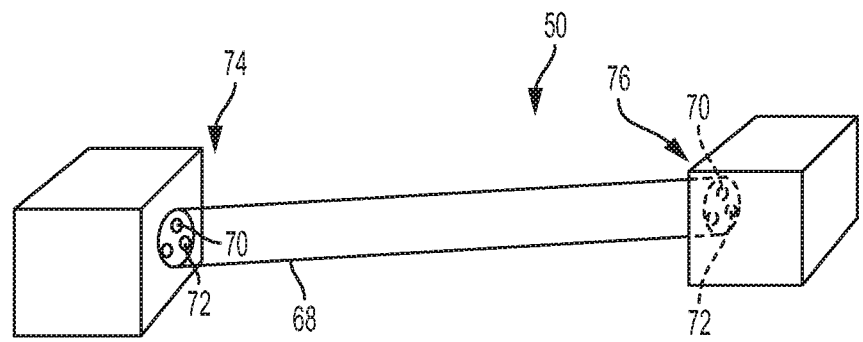
FIG. 4 is a perspective view of an embodiment of a light pipe used in the present methods.
Figure 5:
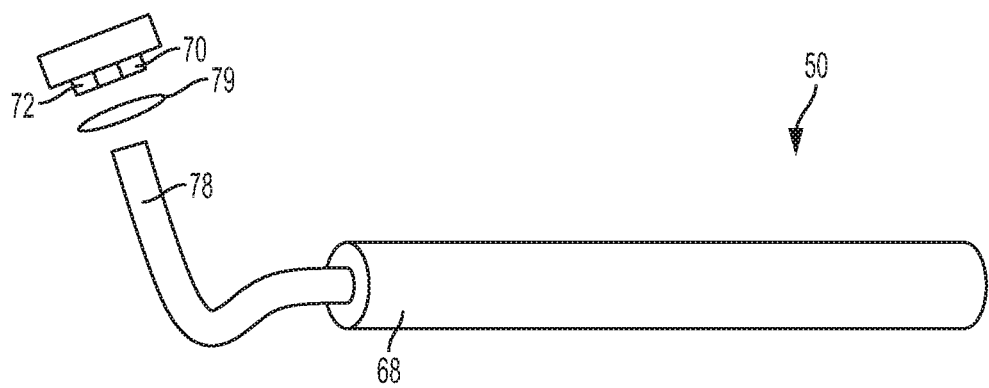
FIG. 5 is a perspective view of an embodiment of a light pipe including a fiber coupling used in the present methods.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these embodiments belong.

Furthermore, as used herein, the words "printer," "printer system", "printing system", "printer device" and "printing device" as used herein encompasses any apparatus, such as a digital copier, bookmaking machine, facsimile machine, multi-function machine, etc. which performs a print outputting function for any purpose. Additionally, as used herein, "sheet," "sheet of paper" and "paper" refer to, for example, paper, transparencies, parchment, film, fabric, plastic, photo-finishing papers or other coated or non-coated substrate media in the form of a web upon which information or markings can be visualized and/or reproduced. Moreover, as used herein, "spectral output" is intended to means the range of wavelengths and amplitudes within the range of wavelengths for an illumination source, while "white light" is intended to mean a combination of wavelengths of light that appear as white or near white to the human eye, i.e., perceived as having no specific color.

As used herein, the term 'average' shall be construed broadly to include any calculation in which a result datum or decision is obtained based on a plurality of input data, which can include but is not limited to, weighted averages, yes or no decisions based on rolling inputs, etc. it should be understood that the use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, although any methods, devices or materials similar or equivalent to those described herein can be used in the practice or testing of these embodiments, some embodiments of methods, devices, and materials are now described.

The present disclosure sets forth systems, e.g., system 40, and methods of spatially and spectrally calibrating a spectrophotometer comprising full width illumination source 50 and full width photodetector array 52. Full width illumination source 50 comprises a first plurality of spectral outputs, a second plurality of spectral outputs. Full width photodetector array 52 comprises adjacent first, second and third rows of photosensitive elements 54, 56 and 58, respectively. First row of photosensitive elements 54 comprises red filter 60, second row of photosensitive elements 56 comprises green filter 62, and third row of photosensitive elements 58 comprises blue filter 64, The first plurality of spectral outputs combine to form a white light illumination output and the second plurality of spectral outputs combine to form a cyan light illumination output.

It should be appreciated that the foregoing spectral outputs may be modified from the recited wavelengths or combination of wavelengths, e.g., red, green and blue light may be used. Moreover, the various wavelengths included may be sequentially emitted, as needed, to more effectively illuminate a sample such as a moving test patch. Still further, various combinations of illumination spectrum, filter transmissions and color test patches may be used to obtain a large amount of spectral and spatial data. For example, with proper selection, three spectral outputs (red, green and blue), three filter types (orange, yellow and purple) and three test patches (red-orange, yellow-green and blue-violet) could result in twenty-seven different combinations.

The present method comprises emitting a white fight illumination output from full width illumination source 50. The white light illumination output is used to illuminate test patch 66. Subsequently, a portion of the white light illumination output is reflected from test patch 66 to form a white light reflected illumination output. The white light reflected illumination output is received by first, second and third rows of photosensitive elements 54, 56 and 58, respectively, to form a first calibration data set. Next, the cyan light illumination output is emitted from the full width illumination source. The cyan light illumination output is used to illuminate test patch 66. A portion of the cyan light illumination output is reflected from test patch 66 to form a cyan light reflected illumination output. The cyan light reflected illumination output is received by second and third rows of photosensitive elements 56 and 58, respectively, to form a second calibration data set. In some embodiments, the present method further comprises determining a calibration matrix based on the first and second calibration data sets.

The calibration matrix of the full width array is a 31×n matrix conversion that approximates the thirty-one spectral reflectance values using n photosensitive element measurements provided by the illuminant or illuminants at each spatial location. The determination of the calibration matrix of the full width array is done empirically using a large set of printed color patches, e.g., more than three hundred, and for each patch, measuring both: the n values of the photosensitive elements of the full width array; and, the thirty-one spectral reflectances from a reference spectrophotometer to be emulated. The n average photosensitive element measurements for each patch of the full width array are calculated by averaging the n average photosensitive element measurements of each location over the area corresponding to that patch. Calculating the matrix that results in the minimum mean square error (MMSE) when fitting one set of data, i.e., the spectral reflectances, using another set of data, i.e., the photosensitive responses, is well known in the art of linear regression. The most common technique, applicable when the problem is not ill-posed, utilizes calculating and applying the pseudo-inverse of the input data set, i.e., photosensitive responses. If the problem is ill-posed there are several techniques that create an inverse insensitive to noise in the measured data. These techniques include, but are not limited to: Tikhonov regularization, device calibration using augmented data with hadamard variation (See, e.g., United States Patent Application Publication No. 2015/016821), and machine learning and rate-distortion cost functions for enabling the optimization of device calibration (See, e.g., United States Patent Application Publication No. 2015/0168184).

In some embodiments, full width illumination source 50 comprises light pipe 68, first light emitting diode 70 and second light emitting diode 72. Light pipe 68 comprises first and second ends 74 and 76, respectively. First light emitting diode 70 is adapted to emit the white light illumination output, while second light emitting diode 72 is adapted to emit the cyan light illumination output. Each of first and second light emitting diodes 70 and 72, respectively, is optically coupled to first end 74 and/or second end 76. In some embodiments, at least one of first and second light emitting diodes 70 and 72, respectively, is optically coupled to fight pipe 68 by fiber optic element 78 and lens 79 arranged therebetween. In some embodiments, light pipe 68 is arranged to produce the white light illumination output and the cyan light illumination output substantially uniformly along the light pipe. Other illumination sources are also possible, e.g., a full width organic light emitting diode (OLED) or combination of OLEDs that collectively result in full width illumination.

In some embodiments, full width illumination source 50 is arranged to produce the white light illumination output and the cyan light illumination output substantially uniformly along light pipe 68. In some embodiments, full width illumination source 50 comprises first row of light emitting diodes 80 adapted to emit at least one of the white light illumination output and the cyan light illumination output. In some of those embodiments, full width illumination source 50 further comprises second row of light emitting diodes 82 adapted to emit at least one of the white light illumination output and the cyan light illumination output.

In some embodiments, test patch 66 comprises full width image 84 having a uniform color in a cross process direction, i.e., in the direction depicted by bi-directional arrow 86, while in some embodiments, test patch 66 comprises full width image 88 having a non-uniform color in the cross process direction, i.e., the direction depicted by bi-directional arrow 86. It should be appreciated that in some embodiments, test patch 66 comprises full width image 90, i.e., the combination of full width images 84 and 88. In short, full width image 90 comprises both a uniform color portion and a non-uniform color portion in the cross process direction. Test patch 66 may include any number of colors, e.g., two thousand or more colors, thereby providing additional calibration data.

Figure 6:
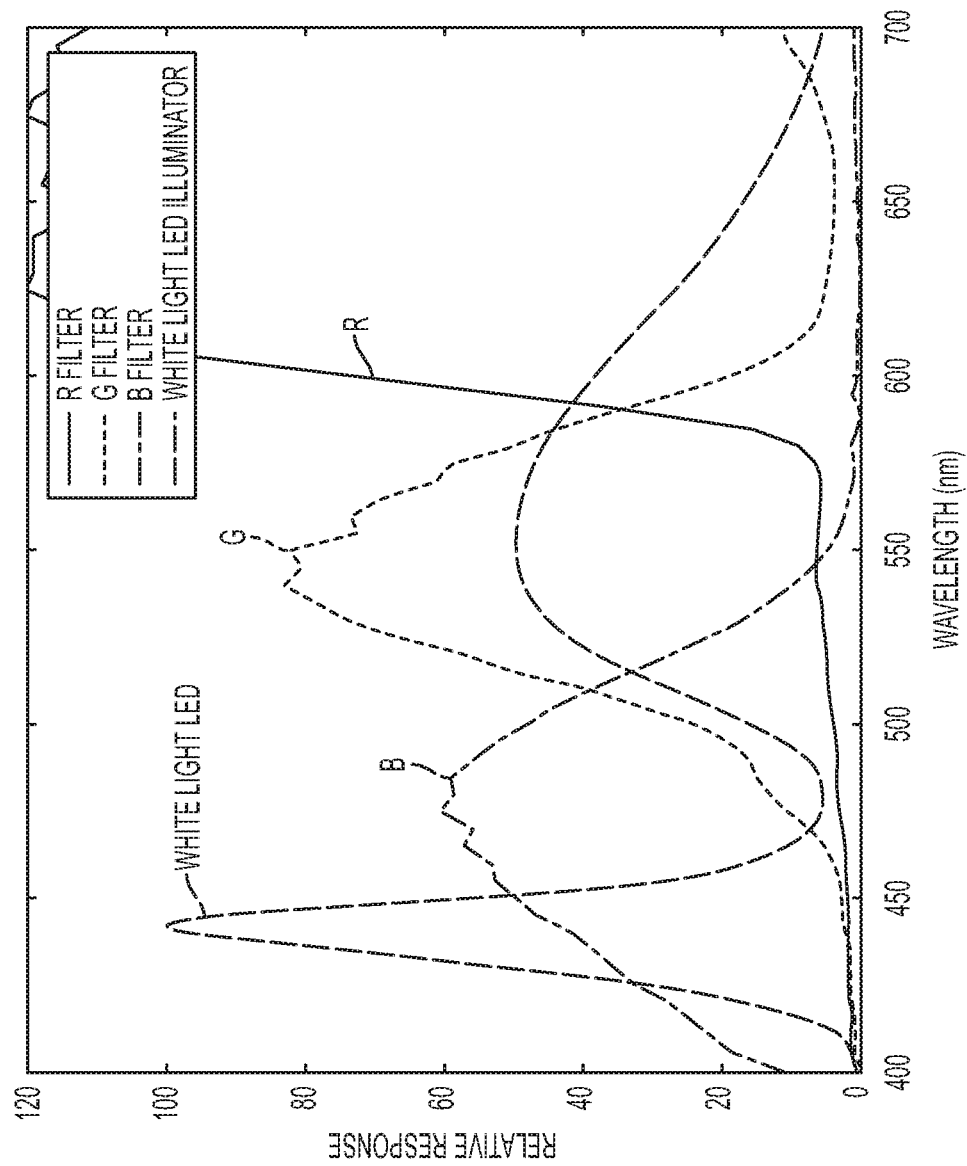
FIG. 6 is a graphical representation of a spectral output of an embodiment of a white light LED and percent transmissions of three filters used in combination with the white light LED.
Figure 7:
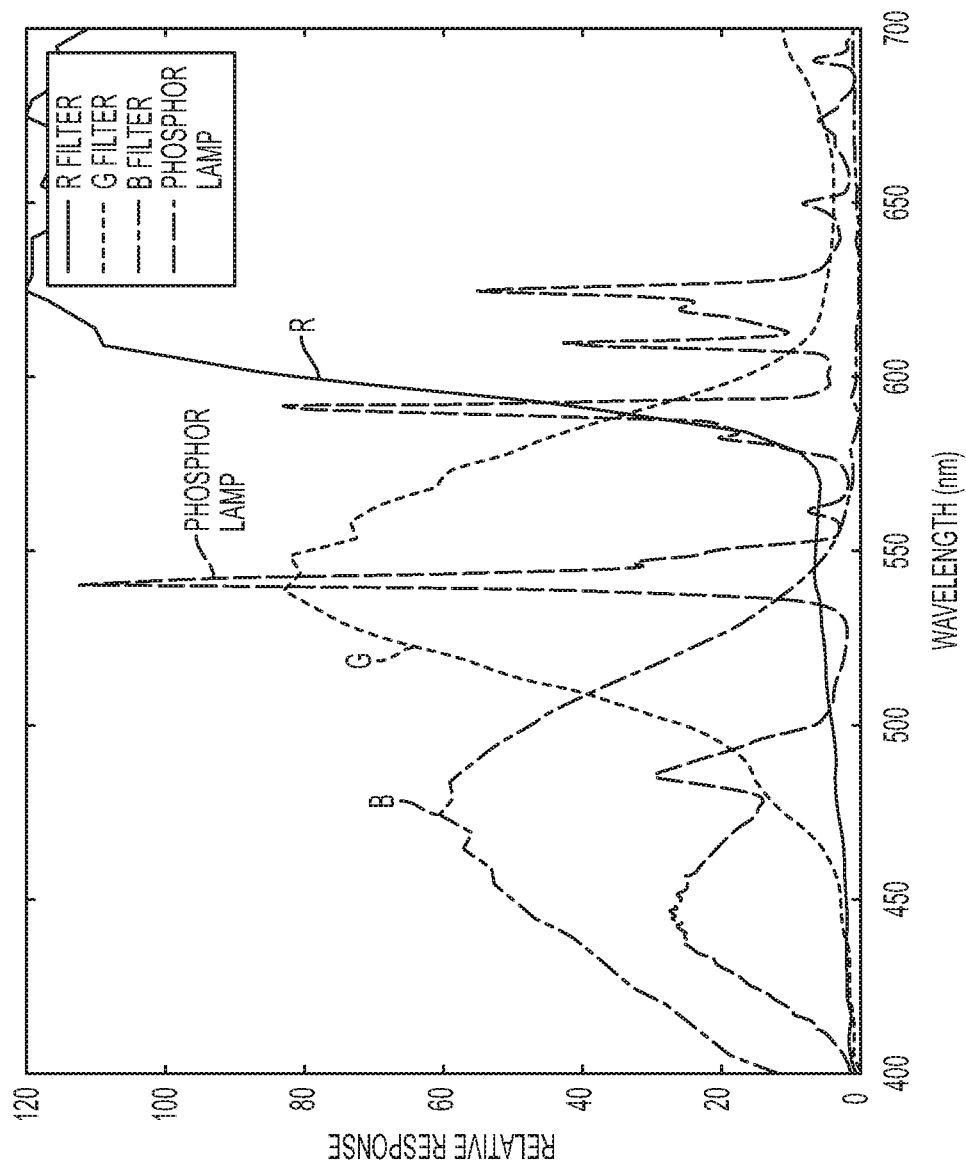
FIG. 7 is a graphical representation of a spectral output of an embodiment of a white light source, i.e., a phosphor lamp, and percent transmissions of three filters used in combination with the white light source.
Figure 8:
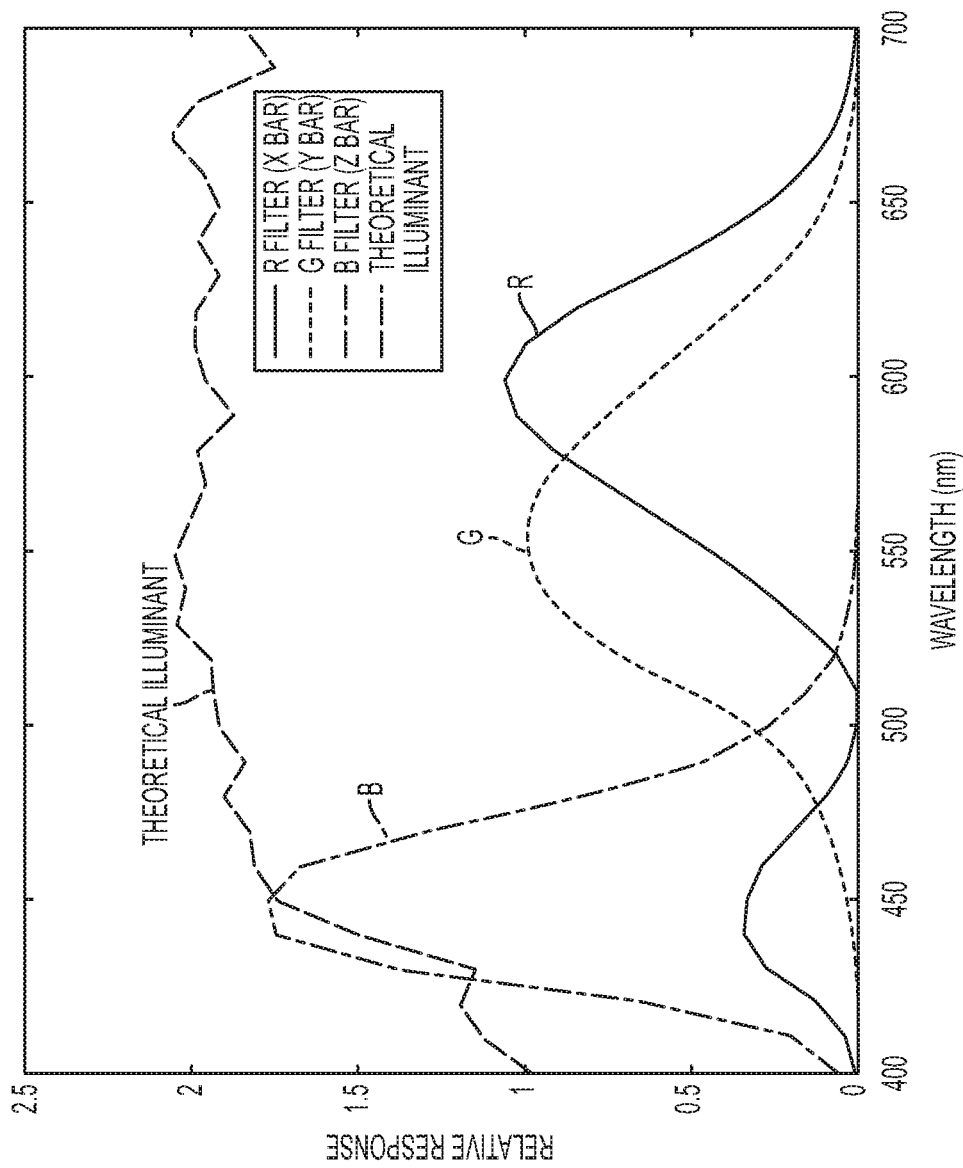
FIG. 8 is a graphical representation of a spectral output of an embodiment of a white light source, i.e., a theoretical illuminant, and percent transmissions of three theoretical filters used in combination with the theoretical illuminant to provide perfect noise-free XYZ detection capability; and, FIG. 9 is a graphical representation of a spectral output of an embodiment of a white light LED and percent transmission of a filter having transmission of wavelengths of light between spectral peaks output from the white light LED.
Figure 9:
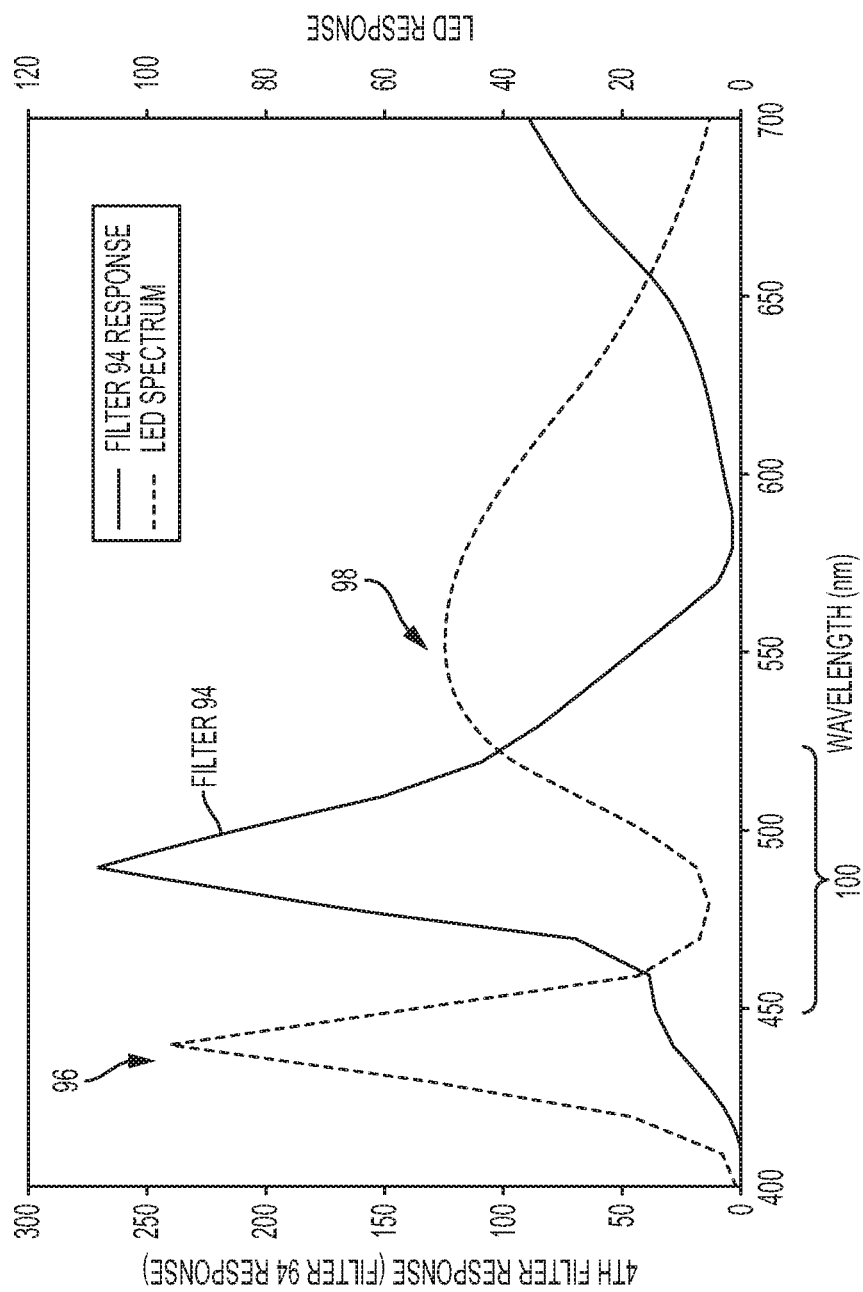

In some embodiments, the white light illumination output is formed by a blue light emitting diode in combination with a yellow phosphor layer, while in some of those embodiments, the blue light emitting diode is an indium gallium nitride (InGaN) light emitting diode. FIG. 6 depicts an example output of a white light LED. As can be seen in the figure, an output from a white light LED may include a first spectral peak at approximately 440 nm, and a second spectral peak at about 560 nm. Collectively, the two spectral peaks result in a white light spectral output. Similarly, FIG. 7 depicts the output of a phosphor lamp. As can be seen in that figure, the illumination source may include more than two spectral peaks that collectively result in a white light spectral output. Still further, FIG. 8 depicts a theoretical illuminant that provides a generally uniform output of all visible wavelengths, which also collectively results in a white light spectral output. It should be appreciated that the additional curves present in FIGS. 6-8 depict examples of responses for filters that may be used in various embodiments of the present systems and methods, i.e., red, green and blue filters.

In some embodiments, full width photodetector array 52 comprises fourth row of photosensitive elements 92 which comprises filter 94. In these embodiments, the step of receiving the white light reflected illumination output further comprises receiving the white light reflected illumination output at fourth row of photosensitive elements 92, and the step of receiving the cyan light reflected illumination output further comprises receiving the cyan light reflected illumination output at first and fourth rows of photosensitive elements 54 and 92, respectively. Furthermore, in some of these embodiments, the first plurality of spectral outputs comprises at least two spectral peaks, e.g., spectral peaks 96 and 98, and filter 94 is adapted to transmit a plurality of wavelengths of light between the at least two spectral peaks, e.g., spectral range 100. In some embodiments, filter 94 comprises a peak wavelength of about 510 nm and a full width at half maximum of about 50 nm.

The present disclosure sets forth another embodiment of a method of spatially and spectrally calibrating a spectrophotometer comprising full width illumination source 50 and full width photodetector array 52. Full width illumination source 50 comprises a first plurality of spectral outputs and full width photodetector array 52 comprises adjacent first, second, third and fourth rows of photosensitive elements 54, 56, 58 and 92, respectively. First row of photosensitive elements 54 comprises red filter 60, second row of photosensitive elements 56 comprises green filter 62, third row of photosensitive elements 58 comprises blue filter 64, and fourth row of photosensitive elements 92 comprises fourth filter 94. The first plurality of spectral outputs combine to form a white light illumination output.

In another embodiment, the present method comprises emitting the white light illumination output from full width illumination source 50. Then, test patch 66 is illuminated with the white light illumination output. In turn, a portion of the white light illumination output is reflected from test patch 66 to form a white light reflected illumination output. The white light reflected illumination output is received by first, second, third and fourth rows of photosensitive elements 54, 56, 58 and 92, respectively, to form a first calibration data set. In some embodiments, the present method further comprises determining a calibration matrix based on the first calibration data set.

The present systems and methods are capable of estimating color accuracy (Delta E) to within 5 units, and in some embodiments, to within 1.5 units. The perfect XYZ detector represented in FIG. 8 can only achieve color accuracy of 3.8 units, or more, in the presence of similar noise.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of spatially and spectrally calibrating a spectrophotometer comprising a full width illumination source and a full width photodetector array, the full width illumination source comprises a first plurality of spectral outputs and a second plurality of spectral outputs, and the full width photodetector array comprises adjacent first, second and third rows of photosensitive elements, the first row of photosensitive elements comprises a red filter, the second row of photosensitive elements comprises a green filter, and the third row of photosensitive elements comprises a blue filter, wherein the first plurality of spectral outputs combine to form a white light illumination output and the second plurality of spectral outputs combine to form a cyan light illumination output, the method comprising:
 a) emitting the white light illumination output from the full width illumination source;
 b) illuminating a test patch with the white light illumination output;
 c) reflecting a portion of the white light illumination output from the test patch to form a white light reflected illumination output;
 d) receiving the white light reflected illumination output at the first, second and third rows of photosensitive elements to form a first calibration data set;
 e) emitting the cyan light illumination output from the full width illumination source;
 f) illuminating the test patch with the cyan light illumination output;
 g) reflecting a portion of the cyan light illumination output from the test patch to form a cyan light reflected illumination output; and
 h) forming a second calibration data set from the cyan light reflected illumination output received at only the second and third rows of photosensitive elements.

2. The method of spatially and spectrally calibrating a spectrophotometer of claim 1 further comprising:
 i) determining a calibration matrix based on the first and second calibration data sets.

3. The method of spatially and spectrally calibrating a spectrophotometer of claim 1 wherein the full width illumination source comprises:
 a light pipe comprising first and second ends;
 a first light emitting diode adapted to emit the white light illumination output; and,
 a second light emitting diode adapted to emit the cyan light illumination output,
 wherein each of the first and second light emitting diodes is optically coupled to the first end or the second end.

4. The method of spatially and spectrally calibrating a spectrophotometer of claim 3 wherein at least one of the first and second light emitting diodes is optically coupled to the light pipe by a fiber optic element arranged therebetween.

5. The method of spatially and spectrally calibrating a spectrophotometer of claim 3 wherein the light pipe is arranged to produce the white light illumination output and the cyan light illumination output substantially uniformly along the light pipe.

6. The method of spatially and spectrally calibrating a spectrophotometer of claim 1 wherein the full width illumination source is arranged to produce the white light illumination output and the cyan light illumination output substantially uniformly along the light pipe.

7. The method of spatially and spectrally calibrating a spectrophotometer of claim 1 wherein the full width illumination source comprises a first row of light emitting diodes adapted to emit at least one of the white light illumination output and the cyan light illumination output.

8. The method of spatially and spectrally calibrating a spectrophotometer of claim 7 wherein the full width illumination source further comprises a second row of light emitting diodes adapted to emit at least one of the white light illumination output and the cyan light illumination output.

9. The method of spatially and spectrally calibrating a spectrophotometer of claim 1 wherein the test patch comprises a full width image having a uniform color in a cross process direction.

10. The method of spatially and spectrally calibrating a spectrophotometer of claim 1 wherein the test patch comprises a full width image having a non-uniform color in a cross process direction.

11. The method of spatially and spectrally calibrating a spectrophotometer of claim 1 wherein the white light illumination output is formed by a blue light emitting diode in combination with a yellow phosphor layer.

12. The method of spatially and spectrally calibrating a spectrophotometer of claim 11 wherein the blue light emitting diode is an indium gallium nitride (InGaN) light emitting diode.

* * * * *